Oct. 7, 1924.
J. P. GERAGHTY
AUTOMOBILE LOCK
Filed Feb. 7, 1923
1,511,119
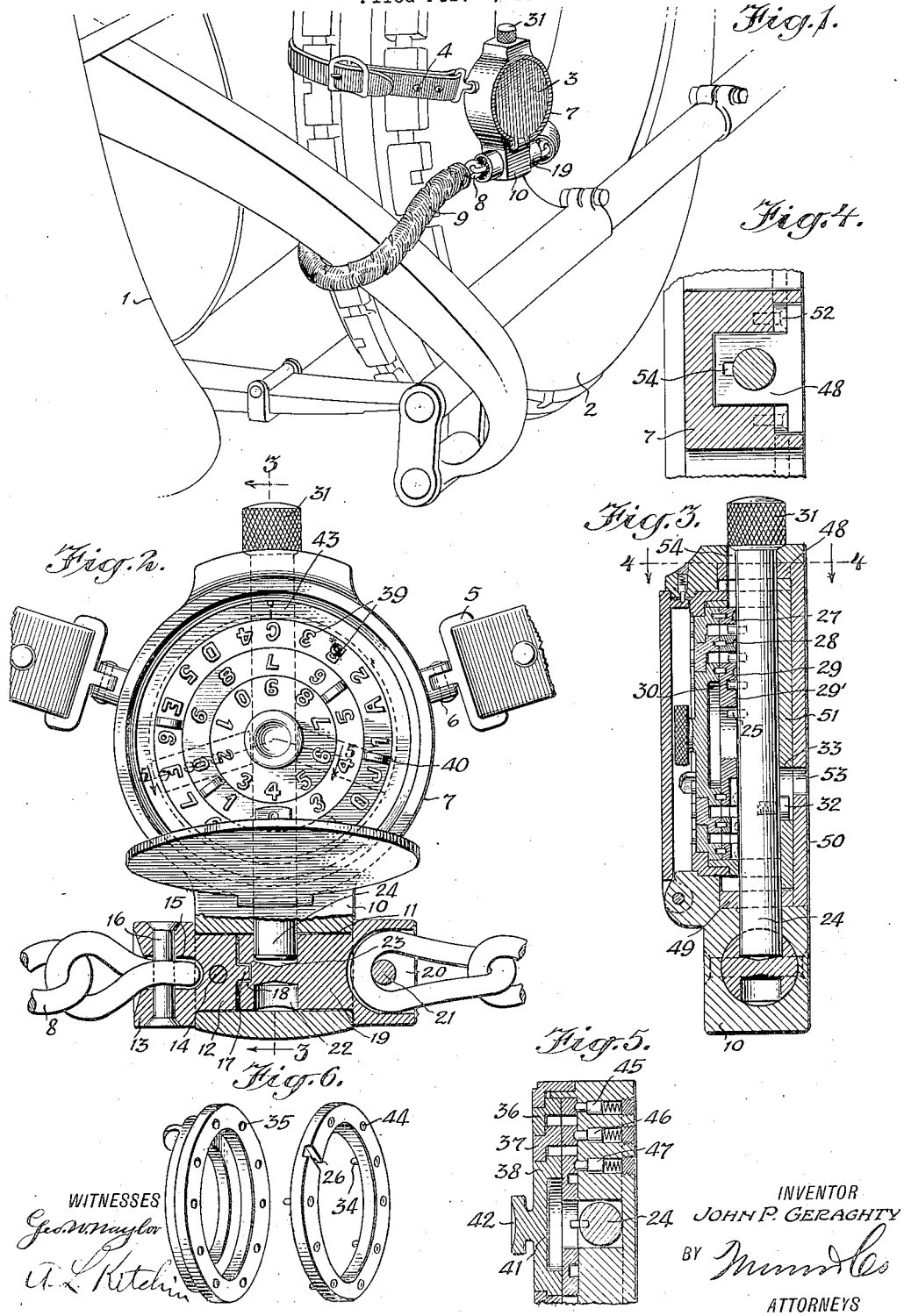
INVENTOR
JOHN P. GERAGHTY
WITNESSES
BY
ATTORNEYS Patented Oct. 7, 1924.

1,511,119

UNITED STATES PATENT OFFICE.

JOHN P. GERAGHTY, OF JERSEY CITY, NEW JERSEY.

AUTOMOBILE LOCK.

Application filed February 7, 1923. Serial No. 617,594.

*To all whom it may concern:*

Be it known that I, JOHN P. GERAGHTY, a citizen of the United States, and a resident of Jersey City, in the county of Hudson and State of New Jersey, have invented a new and Improved Automobile Lock, of which the following is a full, clear, and exact description.

This invention relates to automobile locks and has for an object to provide an improved construction which is substantially burglar proof while at the same time it permits easy manipulation by an authorized person.

Another object in view is to provide an efficient and simple construction for locking spare automobile tires and other spare parts to an automobile.

A further object of the invention is to provide a lock and chain for locking spare tires and other parts to an automobile wherein the lock and chain are so formed and associated as to provide a simple construction while presenting heavy steel members which are difficult, if not impossible, to break or cut.

A still further object of the invention is to provide a combination lock and chain with suitable connections whereby part of the lock casing acts as protecting means for the terminals of the chain.

An additional object of the invention is to provide a combination lock of a simple, strong construction wherein the locking bolt acts as a retaining member for certain parts of the lock mechanism, the arrangement being such that the locking bolt may be locked in either an open or closed position.

In the accompanying drawing—

Figure 1 is a fragmentary perspective view of the rear part of an automobile showing part of a spare tire thereon with a locking structure embodying the invention arranged in operative position.

Figure 2 is a fragmentary elevation of the lock shown in Figure 1 with the protecting cover open and part of the casing shown in section for illustrating the connection of the locking structure with the chain.

Figure 3 is a sectional view through Figure 2 approximately on line 3—3.

Figure 4 is a fragmentary sectional view through Figure 3 approximately on line 4—4.

Figure 5 is a fragmentary sectional view through Figure 2 on line 5—5.

Figure 6 is a perspective view showing two of the combination rings embodying certain features of the invention.

Referring to the accompanying drawing by numerals, 1 indicates an automobile of any desired kind and 2 a spare tire. As is well known, spare tires are carried at the rear or side or at some other convenient point on an automobile and are usually in view of an ordinary passer by. Unless the spare tire is locked by some means, an unauthorized person may easily remove the same and where it is locked by ordinary locks, a professional thief may readily pick the same or break the lock without detection and then remove the tire.

In the present invention, means have been provided which are intended to present a construction which cannot be picked and which cannot be easily broken so that it will require a long time for a professional thief to break or cut any of the parts and, consequently, the owner or some passer by will observe his actions. In carrying out this idea, a steel chain and a lock having a steel casing are provided and associated together for locking the spare tire in place. As these members are of rather massive construction and of hardened steel, it would be impossible for a thief to break or cut either of these members in a short time and usually if a thief cannot break the lock in a short time he will not attempt to break the lock.

As indicated in Figure 1, the lock 3 is held in a convenient place by an adjustable strap 4 of any desired kind provided with any suitable form of buckle. This strap is connected by suitable pivotally mounted members 5 pivotally connected with projections 6 secured to the casing 7 of the lock 3. Associated with the lock 3 as hereinafter fully described, is a chain 8 of steel which is preferably covered by a jacket 9 of leather or other suitable material to prevent scarring of the automobile or injuring the tire. If desired, a steel or other form of cable could be used instead of a chain, though ordinarily a chain is desirable.

As indicated in Figure 2, the casing 7 is provided with a depending lug 10, which lug is formed with a bore 11 extending entirely therethrough and into this bore the reduced extension 12 of the block 13 is fitted, said reduced extension being rigidly secured in the bore 11 in any suitable manner, as for instance, by a rivet 14. If preferred, the parts could be welded together though ordinarily the rivet 14 will be sufficient. One link of the chain 8 extends into a notch 15 in the block 13 and is locked therein by a suitable rivet 16. The reduced portion 12 is provided with an upstanding web 17 for accommodating the slot or notch 18 in the chain terminal 19, which terminal is provided with a notch 20 in which one of the links of chain 8 is fitted, said link being held in place by a suitable rivet 21. The terminal 19 is provided with bores 22 and 23 on diametrically opposite sides, though if desired the bores could extend entirely through. These two bores are provided so that the terminal may be inserted with either side up but by reason of the notch 17 and the web 18, either bore will be brought into registry with the bolt 24, which bolt is adapted to be moved downwardly into the position shown in Figures 2 and 3 when in a locked position.

It will be noted that when the parts are in the position shown in Figures 2 and 3, the terminal 19 cannot be pulled from the lug 10 of casing 7 and, consequently, the parts are firmly locked together. The locking mechanism in the casing 7 is designed to lock the bolt in its operative position as shown in Figure 2 and also to lock the bolt in its raised or inoperative position when the bolt is retracted from extending into the bore 11.

In constructing the locking mechanism in casing 7 to lock the bolt 24, either in or out, a plurality of pins 25 are secured to the bolt 24, there being shown four in the drawing though a greater or less number might be used. These pins are fastened rigidly to the bolt 24 and in order to retract the bolt 24, the pins 25 must be arranged in line with the slots 26. In Figures 3 and 5, it will be noted that there are provided locking rings 27, 28 and 29, locking ring 29 being provided with an annular depression 30 whereby an auxiliary locking ring structure 29' is provided. The ring 29 is approximately twice as thick as either of the rings 27 and 28 measuring from the periphery inwardly and centrally of this ring is arranged a groove 30 for receiving one of the pins 25 while another pin 25 engages the inner wall of the ring. This arrangement in effect, causes the structure to present practically two rings which have been indicated as 29 and 29'. Each of these rings, including the auxiliary ring structure 29', is provided with a slot 26 and when all of these slots are in alignment, the bolt 28 may be grasped by the knob or head 31 and pulled upwardly when in the position shown in Figure 3. This upward movement is continued until the screw head 32 strikes against the shoulder 33. Each of the rings 27 to 29, is provided with one or more pins 34 designed to fit into any of the apertures 35 in the respective combination rings 36, 37 and 38. When the pins 34 of the respective rings have been properly fitted into the apertures 35, the combination is set and will remain in that one position until the pins have been shifted to other apertures 35. To shift the pins, the bolt 24 and certain other parts must be removed as hereinafter described. By shifting one of the rings the combination naturally will be changed, or if preferred, all of the rings 27, 28 and 29 may be shifted to make an entirely new combination. The combination rings 36, 37 and 38, as shown in Figure 2, are each provided with letter and number legends 39 as well as with projecting ears 40, said ears acting to permit easy movement of the rings. The ring 38 is provided with a connecting central plate 41 merging into a thumb member 42 whereby it may be freely rotated. The parts as shown in Figure 3 are arranged in their locked position.

In order to unlock the parts so that the bolt 24 may be moved upwardly from the position shown in Figure 3, it will be necessary to align the various apertures 26 in line with the indicating member 43 arranged on the casing 7. If the notches 26 are arranged opposite the respective legends B, 9 and 8 reading from the outer ring inwardly, it will be necessary to align the letter and numbers directly below the indication 43 as the parts are shown in Figure 2. When the letter B with the numbers 9 and 8 are aligned below the indication 43, the apertures 26 will be in line with the pins 25 and, consequently, the bolt 24 may be raised manually without any trouble. After the bolt has been raised and the terminal 19 removed, it may be dropped back into its locked position and one of the combination rings moved. This will lock the bolt with the chain disconnected.

In most combination locks used on automobiles, the parts must be left in proper position when the chain is removed and, consequently, anyone looking at the lock may readily see the combination. In the present instance, as soon as the chain terminal 19 is removed, the bolt is moved back to a locked position and one of the combination rings rotated so that if anyone attempts to copy the combination it will not be the correct combination.

Arranged beneath each of the legends 39, except where the notches 26 are provided, are depressions 44 in each of the rings 27, 28 and 29, said depressions accommodating the respective spring pressed tumblers 45, 46 and 47. As the various rings 27 to 29 inclusive are rotated by the combination rings, the tumblers will successively snap into the various depressions 44 and temporarily or resiliently lock the rings in a given position unless some appreciable pressure is exerted to further rotate the rings. By this construction and arrangement, whenever any of the legends are moved a certain distance, the tumblers will snap into an aperture whether or not the slots 29 are in alignment. By reason of this arrangement, the rings are prevented from accidental movement and in addition no one can listen to the snapping of the tumblers and ascertain when the slots 26 are in alignment as the sound of the tumblers will be the same whether these slots are in alignment opposite the indication 43 or whether they are in some other position.

In regard to the bolt 24, the same is slidingly mounted in the turned over ends 48 and 49 of the back plate 50 as indicated particularly in Figures 3 and 4 whereby it locks this plate in position and in turn it is locked in position by the head of screw 32 engaging the shoulder 33 of plate 51. The plate 51 is also held in place by any suitable number of screws 52 screwed into part of the casing 7. Whenever it should be desired to remove the bolt 24, the plate 50 and associated parts, the bolt is moved upwardly from the position shown in Figure 3 until the head of the screw 32 engages the shoulder 33. A screw driver is then inserted through the aperture 53 and the screw 32 removed. The bolt 24 may then be moved upwardly and out of the casing, the pins 25 passing through a suitable groove or slot 54. After the bolt has been taken out, the screw driver or other instrument may be inserted into the opening 53 and the plate 50 moved out of the way, after which the plate 51 may be removed provided the screws 52 have been unscrewed. When this has taken place the other parts may be easily removed or merely the rings 27 to 29 removed and re-set for changing the combination.

What I claim is:—

1. A combination lock of the class described, comprising a casing, a bolt extending through the casing and reciprocating therein, a plurality of pins extending from said bolt for locking the bolt, a plurality of locking rings co-acting with said pins, and a combination ring for each of the locking rings for actuating the locking rings, said combination rings being superimposed on said locking rings and arranged in the same plane so that a substantially flat surface will be presented, each of said combination rings having legends thereon for indicating the position thereof in respect to said pins.

2. A combination lock, comprising a casing, a bolt, a plurality of locking pins extending from the bolt, a locking ring for each locking pin, each of said rings having a slot, an independent combination ring for adjusting each of said locking rings so that the slots may be brought into alignment for permitting the passage of the locking pins as the bolt is moved to a locked or unlocked position, each of said combination rings being provided with a plurality of apertures, said combination rings being arranged in the same plane, and a pin extending from each of said locking rings, said pins fitting into the respective combination rings, all being capable of fitting any of the apertures therein whereby the combination may be changed from time to time.

3. A combination lock, comprising a casing, a locking bolt slidably mounted in the casing, a plurality of locking pins extending from the locking bolt, a locking ring co-acting with each of said pins, each of said rings having a slot, said slots being adapted to be aligned for permitting the locking pins to move, said locking rings being arranged in the same plane, a combination ring superimposed on and connected with each of the locking rings for shifting the same, each of said locking rings being provided with a plurality of depressed portions, and spring pressed tumblers adapted to snap into the respective depressed portions and move therefrom as the locking rings are rotated.

4. A combination lock, comprising a locking bolt, a plurality of locking pins connected with the bolt, a plurality of locking rings arranged in the same plane associated with said pins for normally acting to prevent the pins from moving, each of said locking rings being provided with a plurality of depressions, a combination ring superimposed on and connected with each of the locking rings provided with a series of legends, said legends being spaced apart an equal distance with the depressions in the locking rings, and a spring pressed tumbler for each of the locking rings positioned to snap into said depressions as they move opposite said tumbler whereby as the combination rings move the locking rings past a given point there will be a snapping sound.

5. A combination lock, comprising a casing, a plurality of combination rotatable rings arranged in the front part of the casing, said rings being shouldered and overlapped, a back plate for closing the back of the casing, said back plate having a pair of inwardly extending apertured lugs, a bolt extending through the casing and through the apertures in said apertured lugs, said bolt being capable of reciprocation to move it to a locked and unlocked position, and means co-acting with said combination rings for locking said bolt in a locked position.

JOHN P. GERAGHTY.